United States Patent [19]

Ogawa

[11] Patent Number: 4,633,453
[45] Date of Patent: Dec. 30, 1986

[54] OPTICAL DISC PLAYERS

[75] Inventor: Hiroshi Ogawa, Tokyo, Japan
[73] Assignee: Sony Corporation, Tokyo, Japan
[21] Appl. No.: 582,783
[22] Filed: Feb. 23, 1984
[30] Foreign Application Priority Data
Feb. 28, 1983 [JP] Japan .................................. 58-32585
[51] Int. Cl.⁴ .............................................. G11B 7/095
[52] U.S. Cl. ........................................ 369/44; 369/45
[58] Field of Search ................... 369/44, 45; 250/201, 250/202

[56] References Cited
U.S. PATENT DOCUMENTS
4,502,134  2/1985  Kondo ................................ 369/46
4,503,324  3/1985  Yokota ............................... 369/45

Primary Examiner—Alan Faber
Attorney, Agent, or Firm—Hill, Van Santen, Steadman & Simpson

[57] ABSTRACT

An optical disc player for reproducing an information signal from an optical disc on which the information signal is recorded in the form of pits arranged in a record track comprises an optical arrangement for directing a light beam to the optical disc to be modulated by the record track and reflected thereat, a photodetecting assembly for receiving a reflected light beam from the optical disc to produce in response to the received light beam an output from which a reproduced information signal can be obtained, and a control circuit portion including a tracking error signal producing circuit for generating a tracking error signal from the output of the photodetecting assembly when a beam spot formed by the light beam on the optical disc is positioned on the pit and a focus error signal producing circuit for generating a focus error signal from the output of the photodetecting assembly when the beam spot formed by the light beam on the optical disc is positioned on a plane portion of the optical disc between the pits.

3 Claims, 13 Drawing Figures

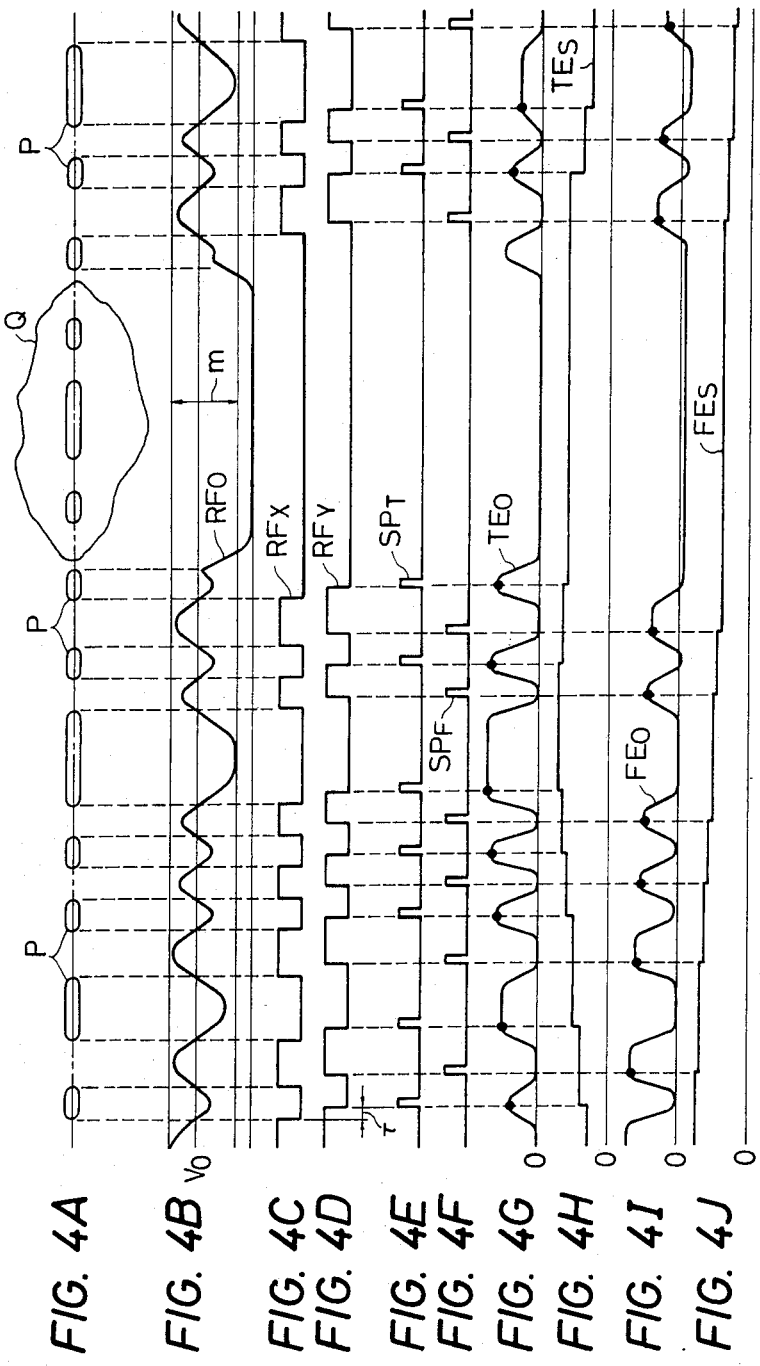

OPTICAL DISC PLAYERS

BACKGROUND OF THE INVENTION

1. Field of the Invention

This invention relates generally to a disc player for reproducing optically an information signal from an optical disc, such as an optical digital audio disc, on which the information signal is recorded in a record track formed with an arrangement of a plurality of small pits, and more particularly, is directed to an optical disc player provided with an improved device for generating a tracking error signal and a focus error signal.

2. Description of the Prior Art

In an optical disc player for reproducing an information signal from an optical disc, such as an optical digital audio disc, on which the information signal is recorded in the form of small pits arranged in a spiral track, a light beam is used for reading the information signal from the spiral track on the optical disc. Such a light beam is emitted from an optical head which is moved in the direction of the radius of the optical disc, and required to trace correctly the spiral track and to be focused correctly on a surface of the optical disc on which the spiral track is formed. For making the light beam comply with such requirements, tracking control and focus control are performed. In the tracking control, a position of a beam spot formed by the light beam on the surface of the optical disc in relation to the spiral track thereon is detected to produce a tracking detection output and a focusing lens in the optical head or the optical head in its entirety is moved in the direction of the radius of the optical disc in response to the tracking detection output, and in the focus control, a focusing condition of the light beam on the surface of the optical disc is detected to produce a focus detection output and the focusing lens in the optical head or the optical head in its entirety is moved in the direction perpendicular to the surface of the optical disc in response to the focus detection output.

With regard to detection of the position of the beam spot formed by the light beam on the surface of the optical disc in relation to the spiral track, there have been proposed several detecting arrangements classified into two types, one of which uses two specific light beams provided in addition to the light beam for reading the information signal and the other of which does not use any additional light beam other than the light beam for reading the information signal. As arrangements of the type operative without two specific light beams, such detecting arrangements as called "push-pull system" and "heterodyne system" have been known. In these detecting arrangements, a reflected light beam from the optical disc, which is modulated in intensity at the surface of the optical disc, is projected onto a photodetector comprising a plurality of photodetecting elements to form a beam spot with its pattern varying in response to the position of the beam spot formed by the light beam on the surface of the optical disc in relation to the spiral track, and variations in the pattern of the beam spot on the photodetector are derived in the form of an electric signal obtained through calculating operation among the outputs of the photodetecting elements constituting the photodetector.

On the other hand, with regard to detection of the focus condition of the light beam on the surface of the optical disc, such detecting arrangements as called "astigmatism system" and "gable roof prism system" have been known. In these detecting arrangements also, a reflected light beam from the optical disc, which is modulated at the surface of the optical disc, is projected onto a photodetector comprising a plurality of photodetecting elements to form a beam spot with its pattern varying in response to the focusing condition of the light beam on the surface of the optical disc, and variations in the pattern of the beam spot on the photodetector are derived in the form of an electric signal obtained through calculating operation among the outputs of the photodetecting elements constituting the photodetector.

In previously proposed optical disc players, the signal obtained through the calculating operation among the outputs of the photodetecting elements constituting the photodetector as mentioned above is used without being modified as a tracking error signal representing deviations of the beam spot formed by the light beam on the surface of the optical disc from a center in width of the spiral track or a focusing error signal representing defocus of the light beam on the surface of the optical disc, and such a tracking error signal or focus error signal is limited to a predetermined frequency range by passing through a certain filter circuit, power amplifier circuit and so on to be a tracking control signal which is supplied to a driving device for tracking control to move the focusing lens in the optical head or the optical head in its entirety in the direction of the radius of the optical disc or a focus control signal which is supplied to a driving device for focus control to move the focus lens in the optical head or the optical head in its entirety in the direction perpendicular to the surface of the optical disc. This results in a problem that it is hard to maintain the light beam in correct tracking relation to each turn of the spiral track though the tracking control is conducted or it is hard to maintain correct focus of the light beam incident upon the surface of the optical disc though the focus control is conducted, and further in another problam that a mechanical noise arises from the driving device for tracking control or focus control. Besides, in the case where the optical disc has a wound or stain on the surface thereof, there is a disadvantage that a so-called track jump movement by which the beam spot formed by the light beam on the surface of the optical disc is moved from a certain turn of the spiral track into another turn of the spiral track adjacent thereto is easy to be caused at a portion of the wound or stain.

In the case of the tracking control arrangement, the above mentioned tracking error signal obtained through the calculating operation among the outputs of the photodetecting elements constituting the photodetector takes a level corresponding to the position of the beam spot formed by the light beam on the surface of the optical disc in relation to the spiral track when the beam spot on the surface of the optical disc is positioned on the pit, but takes a constant level irrelative to the position of the beam spot formed by the light beam on the surface of the optical disc in relation to the spiral track when the beam spot on the surface of the optical disc is positioned on a plane portion between two successive pits. Therefore, such a tracking error signal as a whole contains a frequency component resulting from the arrangement of the pits and does not represent exactly the position of the beam spot formed by the light beam on the surface of the optical disc in relation to the spiral track. Consequently, with the tracking control in the previously proposed optical disc player in which the signal obtained through the calculating operation among the outputs of the photodetecting elements constituting the photodetector is used without being modified as the tracking error signal, such a control as to move the light beam to trace exactly the spiral track can not be achieved.

Then, in the case of the focus control arrangement, the pattern of the beam spot on the photodetector varies faithfully in response to the focusing condition of the light beam on the surface of the optical disc regardless of the position of the beam spot on the surface of the optical disc in relation to the spiral track when the beam spot on the surface of the optical disc is positioned on a plane portion between the pits, but varies in response to both the focusing condition of the light beam on the surface of the optical disc and the position of the beam spot on the surface of the optical disc in relation to the spiral track when the beam spot on the surface of the optical disc is positioned fully or partially on the pit. Accordingly, the above mentioned focus error signal obtained through the calculating operation among the outputs of the photodetecting elements constituting the photodetector takes a level corresponding to defocus of the light beam on the surface of the optical disc when the beam spot on the surface of the optical disc is positioned on the plane portion between the pits, but takes a level which varies in response to variations in the position of the beam spot on the surface of the optical disc in relation to the spiral disc and does not correspond to defocus of the light beam on the surface of the optical disc when the beam spot on the surface of the optical disc is positioned fully or partially on the pit. As a result of this, such a focus error signal as a whole not only contains a frequency component resulting from the arrangement of the pits but also is influenced with variations in the position of the beam spot formed by the light beam on the surface of the optical disc and does not represent exactly defocus of the light beam on the surface of the optical disc. Consequently, with the focus control in the previously proposed optical disc player in which the signal obtained through the calculating operation among the outputs of the photodetecting elements constituting the photodetector is used without being modified as the focus error signal, such a control as to cause the light beam to focus exactly on the surface of the optical disc can not be achieved.

In addition to the above, since the tracking error signal or the focus error signal contains the frequency component resulting from the arrangement of the pits, the mechanical noise resulting from such a frequency component arises from the driving device for moving the focusing lens in the optical head or the optical head in its entirety in the direction of the radius of the optical disc or in the direction perpendiculer to the surface of the optical disc when the tracking or focus control signal obtained on the basis of the tracking or focus error signal is supplied to the driveing device.

Further, in the case where the optical disc has a non-reflecting portion with a wound or stain on the surface thereof, a reproduced information signal obtained from the photodetector onto which the reflected light beam from the optical disc is projected is reduced in its level to be extremely low and the tracking error signal becomes zero regardless of the position of the beam spot on the surface of the optical disc in relation to the spiral track when the light beam scans the nonreflacting portion of the surface of the optical disc. Accordingly, the beam spot formed by the light beam on the surface of the optical disc is moved toward a location determined by the neutral position of the focusing lens in the optical head at the nonreflecting portion of the surface of the optical disc, so that the track jump movement of the light beam is easy to be caused. Similarly, when the light beam scans the nonreflecting portion of the surface of the optical disc, the focus error signal is not obtained and therefore a focusing condition of the light beam on the surface of the optical disc determined in response to the neutral position of the focusing lens in the optical head is taken, so that a large amount of defocus of the light beam on the surface of the optical disc is easy to be brought on.

OBJECTS AND SUMMARY OF THE INVENTION

Accordingly, it is an object of the present invention to provide an optical disc player operative to cause a light beam to impinge on an optical disc on which an information signal is recorded in the form of pits arranged in a record track and to detect a reflected light beam from the optical disc by a photodetector for reproducing the information signal, which can avoid the above described problems in respect of tracking or focus control encountered with the prior art.

Another object of the present invention is to provide an optical disc player in which a light beam is caused to impinge on an optical disc on which an information signal is recorded in the form of pits arranged in a record track and, after being reflected at the optical disc, is guided to a photodetector to be received thereby to produce an output from which a reproduced information signal is obtained, which can generate a tracking error signal representing exactly a position of a beam spot formed by the light beam on the optical disc in relation to the record track and a focus error signal representing exactly defocus of the light beam impinging on the optical disc.

A further object of the present invention is to provide an optical disc player in which a light beam is caused to impinge on an optical disc on which an information signal is recorded in the form of pits arranged in a record track and, after being reflected at the optical disc, is guided to a photodetector to be received thereby to produce an output from which a reproduced information signal is obtained, which generates a tracking error signal when the light beam scans the pit on the optical disc and generates also a focus error signal when the light beam scans a plane portion of the optical disc between the pits thereon.

According to an aspect of the present invention, there is provided an optical disc player comprising a light beam source, an optical device for directing a light beam from the light beam source to an optical disc provided with a plurality of pits arranged in a record track in response to an information signal, a photodetecting assembly for receiving a reflected light beam from the optical disc to produce in response to the received light beam an output from which a reproduced information signal can be obtained, and a control circuit portion including a tracking error signal producing circuit for generating a tracking error signal from the output of the photodetecting assembly when a beam spot formed by the light beam on the optical disc is positioned on the pit and a focus error signal producing circuit for generating a focus error signal from the output of the photodetecting assembly when the beam spot formed by the light beam on the optical disc is positioned on a plane portion between the pits.

With the optical disc player thus constituted in accordance with the present invention, during reproducing operation in which the light beam is directed to the optical disc and the reflected light beam is guided to the photodetecting assembly to produce the output from which the reproduced information signal is obtained, the tracking error signal which is not affected by the arrangement of the pits and represents exactly a position of the beam spot formed by the light beam on the optical disc in relation to the record track and the focus error signal which is also not affected by the arrangement of the pits and represents exactly defocus of the light beam on the optical disc can be obtained, and in response to the tracking error signal and the focus error signal thus obtained, respectively, tracking control which is operative to move the light beam directed to the optical disc to trace accurately the record track and causes a focus control to be operative to cause the light beam directed to the optical disc to focus accurately on the optical disc. Further, in the optical disc player according to the present invention, since neither the tracking error signal nor the focus error signal contain a frequency component resulting from the arrangement of the pits, a harsh mechanical noise is prevented from arising at a driving device which is supplied with tracking and focus control signals obtained on the basis of the tracking and which is focus error signals, respectively, and operative to move a focusing lens in an optical head or the optical head in its entirety both in the direction of the radius of the optical disc and in the direction perpendicular to the surface of the optical disc.

The above and other objects, features and advantages of the present invention will become apparent from the following detailed description taken in conjunction with the accompanying drawings.

BRIEF DESCRIPTION OF THE DRAWINGS

FIGS. 4A to 4J are waveform diagrams used for explaining the operation of the essential part of the embodiment shown in FIG. 3.

DESCRIPTION OF THE PREFERRED EMBODIMENT

First, for the purpose of facilitating the understanding of the present invention, a previously proposed optical disc player will be described with reference to FIG. 1.

Figure 1:
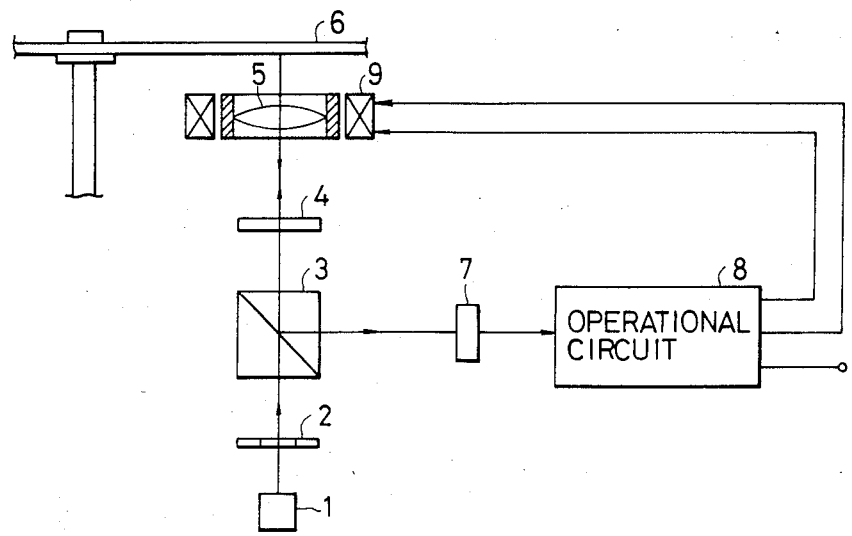
FIG. 1 is a schematic illustration showing a part of a previously proposed optical disc player in which an optical arrangement and a circuit for producing a reproduced information signal, a tracking error signal and a focus error signal are included.

FIG. 1 shows a part of the previously proposed optical disc player in which an optical arrangement forming an optical head and a circuit for deriving a reproduced information signal and tracking and focus error signals are included. In FIG. 1, a laser light beam emitted from a laser light source 1 is directed, through an iris 2 which is provided as occasion demands, a polarized beam splitter 3, a quarter wavelength plate 4 and an object lens 5 serving as a focusing lens, to an optical disc 6 on which an information signal is recorded in the form of pits arranged in a spiral record track to impinge thereon. At a surface of the optical disc 6 in which the record track is formed, the laser light beam incident thereupon is modulated in intensity and reflected, and the reflected laser light beam enters through the object lens 5 and the quarter wavelength plate 4 into the polarized beam splitter 3. This reflected laser light beam is turned at the polarized beam splitter 3 to be guided to a photodetecting assembly 7. The photodetecting assembly 7 detects the reflected laser light beam to produce an output signal varying in response to variations in the reflected laser light beam and supplies it to an operational circuit 8. At the operational circuit 8, a reproduced information signal, a first resultant signal used as a tracking error signal and a second resultant signal used as a focus error signal are produced from the output signal of the photodetecting assembly 7. The first and second resultant signals are supplied to a driving device 9 for moving the object lens 5 both in the direction of the radius of the optical disc 6 and in the direction perpendicular to the surface of the optical disc 6 so as to carry out tracking and focus controls.

Figure 2:
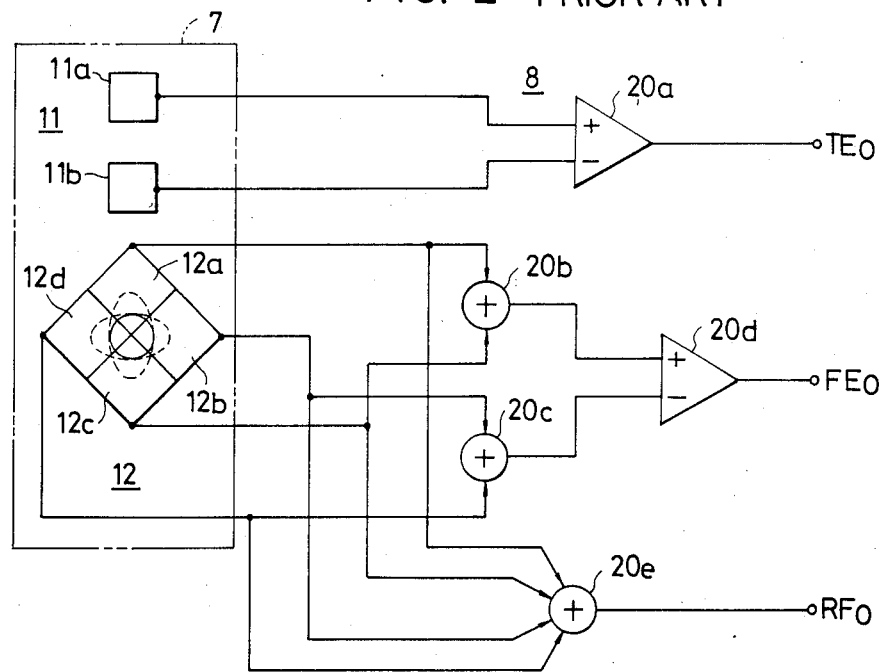
FIG. 2 is a schematic block diagram showing one example of a combination of a photodetecting assembly and an operational circuit used in the part of the optical disc player shown in FIG. 1.

FIG. 2 shows a concrete example of a combination of the photodetecting assembly 7 and the operational circuit 8 shown in FIG. 1. In this example, the photodetecting assembly 7 comprises a first photodetector 11 composed of two photodetecting elements 11a and 11b on which the reflected laser light beam is projected and a second photodetector 12 composed of four photodetecting elements 12a, 12b, 12c and 12d on which the reflected laser light beam is also projected. On the other hand, the operational circuit 8 comprises a subtracter 20a for making the difference between outputs of the photodetecting elements 11a and 11b, an adder 20b for making the sum of outputs of the photodetecting elements 12a and 12c, an adder 20c for making the sum of outputs of the photodetecting elements 12b and 12d, a subtracter 20d for making the difference between outputs of the adders 20b and 20c, and an adder 20e for summing up the outputs of the photodetecting elements 12a, 12b, 12c and 12d. The first photodetector 11 and the subtracter 20a constitute an arrangement for producing the first resultant signal TE$_O$, which is used as the tracking error signal in the optical disc player shown in FIG. 1, in accordance with a so-called push pull system, and the second photodetector 12, the adders 20b and 20c, and the subtracter 20d constitute an arrangement for producing the second resultant signal FE$_O$, which is used as the focus error signal in the optical disc player shown in FIG. 1, in accordance with a so-called astigmatism system. Further, the adder 20e produces the reproduced information signals RF$_O$ from the outputs of the four photodetecting elements 12a to 12d forming the second photodetector 12.

In such an optical disc player proposed previously, the first and second resultant signals TE$_O$ and TF$_O$ obtained from the subtracters 20a and 20d, respectively, are used without being modified as the tracking and focus error signals, and this results in the aforementioned problems.

Now, one embodiment of optical disc player according to the present invention will be described with reference to FIGS. 3 and 4A to 4J hereinafter.

Figure 3:
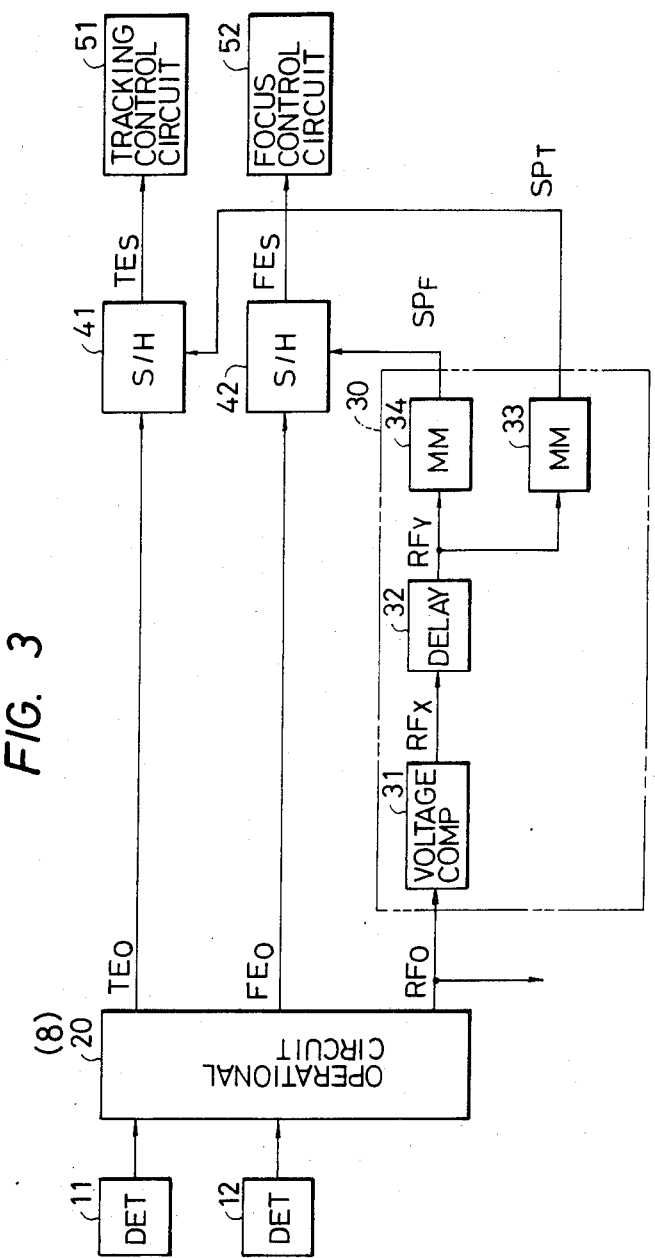
FIG. 3 is a schematic block diagram showing an essential part of one embodiment of optical disc player according to the present invention.

FIG. 3 shows an essential part of one example of the optical disc player according to the present invention. This example employs such an optical arrangement forming an optical head as shown in FIG. 1 and an optical disc on which an information signal is recorded in the form of pits arranged in a spiral record track or a plurality of record tracks formed into concentric circles is loaded thereon, though they are not shown in the drawings.

In the example of FIG. 3, the first and second photodetectors 11 and 12 as shown in FIG. 2 are also employed for receiving a reflected laser light beam coming through the optical arrangement as shown in FIG. 1 from the optical disc and an operational circuit 20 which corresponds to the operational circuit 8 shown in FIG. 2 is provided to be supplied with the outputs of the first and second photodetectors 11 and 12. Accordingly, the first resultant signal $TE_O$, the second resultant signal $FE_O$ and the reproduced information signal $RF_O$ obtained in such a manner as mentioned above are also derived from the operational circuit 20.

The first resultant signal $TE_O$, which is used as the tracking error signal in the optical disc player shown in FIG. 1, appears with a waveform such as shown in FIG. 4G which takes a level corresponding to the position of a beam spot formed by the laser light beam on the optical disc in relation to the record track when the beam spot on the optical disc is positioned fully on one of the pots P arranged as shown in FIG. 4A. On the other hand, the second resultant signal $FE_O$, which is used as the focus error signal in the optical disc player shown in FIG. 1, appears with a waveform such as shown in FIG. 4I which takes a level corresponding to defocus of the laser light beam projected onto the optical disc when the beam spot formed by the laser light beam on the optical disc is positioned fully on a plane portion between the pits P arranged as shown in FIG. 4A.

The reproduced information signal $RF_O$ which appears with a waveform such as shown in FIG. 4B is supplied to a sampling pulse generating circuit 30. This sampling pulse generating circuit 30 produces a first sampling pulse $SP_T$ appearing as shown in FIG. 4E when the beam spot formed by the laser light beam on the optical disc is positioned fully on the pit P and a second sampling pulse $SP_F$ appearing as shown in FIG. 4F when the beam spot formed by the laser light beam on the optical disc is positioned fully on the plane portion of the optical disc between the pits P on the basis of the reproduced information signal $RF_O$. In the sampling pulse generating circuit 30, the reproduced information signal $RF_O$ is supplied to a voltage comparator 31 and compared with a reference voltage $V_O$ thereat to produce a reformed reproduced information signal $RF_X$ having a rectangular waveform as shown in FIG. 4C. The reformed reproduced information signal $RF_X$ is supplied to a delay circuit 32 to be delayed by a predetermined time $\tau$, so that a rectangular waveform signal $RF_Y$ having a falling edge at each instant at which the beam spot formed by the laser light beam on the optical disc passes out of the front edge of the pit P and a rising edge at each instant at which the beam spot formed by the laser light beam on the optical disc passes out of the rear edge of the pit P, as shown in FIG. 4F, is obtained from the delay circuit 32. The rectangular waveform signal $RF_Y$ is supplied to both monostable multivibrators 33 and 34. The monostable multivibrator 33 is triggered by each falling edge of the rectangular waveform signal $RF_Y$ to produce the first sampling pulse $SP_T$ and the monostable multivibrator 34 is triggered by each rising edge of the rectangular waveform signal $RF_Y$ to produce the second sampling pulse $SP_F$.

The first resultant signal $TE_O$ derived from the operational circuit 20 and the first sampling pulse $SP_T$ are supplied to a first sampling and hold circuit 41, so that the first resultant signal $TE_O$ is subjected to sampling by the first sampling pulse $SP_T$ and the level of the sampled segment of the first resultant signal $TE_O$ is held up until the next sampling at the first sampling and hold circuit 41. Similarly, the second resultant signal $FE_O$ derived from the operational circuit 20 and the second sampling pulse $SP_F$ are supplied to a second sampling and hold circuit 42, so that the second resultant signal $FE_O$ is subjected to sampling by the second sampling pulse $SP_F$ and the level of the sampled segment of the second resultant signal $FE_O$ is held up until the next sampling at the second sampling and hold circuit 42.

As aforementioned, since the first resultant signal $TE_O$ takes the level corresponding to the position of the beam spot formed by the laser light beam on the optical disc in relation to the record track when the beam spot on the optical disc is positioned fully on the pit P, an output signal $TE_S$ of the first sampling and hold circuit 41 obtained by the sampling and holding operation thereat as shown in FIG. 4H as a whole represents exactly the position of the beam spot formed by the laser light beam on the optical disc in relation to the record track and scarcely contain a frequency component resulting from the arrangement of the pits P. Similarly, since the second resultant signal $FE_O$ takes the level corresponding to defocus of the laser light beam being projected onto the optical disc when the beam spot formed by the laser light beam on the optical disc is positioned fully on the plane portion between the pits P, an output signal $FE_S$ of the second sampling and hold circuit 42 obtained by the sampling and hold operation thereat as shown in FIG. 4J as a whole represents exactly defocus of the laser light beam projected onto the optical disc and scarcely contain a frequency component resulting from the arrangement of the pits P.

Then, the output signal $TE_S$ from the first sampling and hold circuit 41 is supplied to a tracking control circuit 51 as a tracking error signal, and the output signal $FE_S$ from the second sampling and hold circuit 42 is supplied to a focus control circuit 52 as a focus error signal. The tracking control circuit 51 produces a tracking control signal from the tracking error signal $TE_S$ therein and supplies the same to the driving device 9 provided to the objective lens 5 in the same manner as in FIG. 1 for moving the objective lens 5 in the direction of the radius of the optical disc so that tracking control is carried out. Further, the focus control circuit 52 produces a focus control signal from the focus error signal $FE_S$ therein and supplies the same also to the driving device 9 for moving the objective lens 5 in the direction perpendicular to the surface of the optical disc so that focus control is carried out.

In the optical disc player according to the present invention having the essential parts thus constituted, the tracking error signal $TE_S$ is generated on the basis of the first resultant signal $TE_O$ when the beam spot formed by the laser light beam on the optical disc is positioned fully on the pit P and is delayed until the next generation, and therefore the tracking error signal $TE_S$ as a whole represents exactly the position of the beam spot formed by the laser light beam on the optical disc in relation to the record track. Accordingly, the laser light beam directed to the optical disc is controlled to trace correctly the record track under the tracking control performed in response to the tracking error signal $TE_S$.

Similarly, the focus error signal $FE_S$ is generated on the basis of the second resultant signal $FE_O$ when the beam spot formed by the laser light beam on the optical disc is positioned fully on the plane portion between the pits P and is delayed until the next generation, and therefore the focus error signal $FE_S$ as a whole represents exactly defocusing of the laser light beam on the optical disc. Accordingly, the laser light beam directed to the optical disc is controlled to focus correctly on the optical disc under the focus control performed in response to the focus error signal $FE_S$.

Further, each of the tracking error signal $TE_S$ and the focus error signal $FE_S$ contains substantially no frequency components resulting from the arrangement of the pits P and therefore the driving device does not cause any harsh mechanical noise when it operates in response to the tracking and focus control signals produced from the tracking and focus error signals, respectively.

In the case where the optical disc has a nonreflecting portion Q with a wound or stain on the surface thereof as shown in FIG. 4A, the first resultant signal $TE_O$ becomes zero regardless of the position of the beam spot formed by the laser light beam on the optical disc in relation to the record track when the laser light beam scans the nonreflecting portion Q and at that time the reproduced information signal $RF_O$ takes such a low level and gets out of the modulation range m shown in FIG. 4B so that the first sampling pulse $SP_T$ is not produced. Therefore, the tracking error signal $TE_S$ keeps its level obtained just before the laser light beam has started to scan the nonreflecting portion Q during a period in which the laser light beam scan the nonreflecting portion Q, so that track jump movement of the laser light beam is prevented from occuring. Further, the second sampling pulse $SP_F$ is also not produced when the laser light beam scans the nonreflecting portion Q of the optical disc, and therefore the focusing error signal $FE_S$ keeps its level obtained just before the laser light beam had started to scan the nonreflecting portion Q during the period in which the laser light beam scans the nonreflecting portion Q, so that the laser light beam is prevented from having a large amount of defocus.

What is claimed is:

1. An optical disc player for reproducing an information signal recorded in the form of pits arranged in a record track on a disc, comprising; light source means for generating a light beam, optical means for directing the light beam from said light source means to the disc to be modulated by the record track and reflected thereat, photodetecting means for receiving a reflected light beam from the disc to produce in response to the received light beam an output from which a reproduced information signal can be obtained, and control circuit means including a first circuit portion for generating a tracking error signal from the output of said photodetecting means when a beam spot formed by the light beam on the disc is positioned on the pit and a second circuit portion for generating a focus error signal from the output of said photodetecting means when the beam spot formed by the light beam on the disc is positioned on a plane portion between the pits, and, wherein said first circuit portion comprises first operational circuit means for producing from the output of said photodetecting means a first signal having a level corresponding to the position of the beam spot formed by the light beam on the disc in relation to the record track when the beam spot on the disc is positioned on the pit, first pulse generating means for producing a first sampling pulse when the beam spot on the disc is positioned on the pit, and first sampling and hold means for causing said first signal to be subjected to sampling by said first sampling pulse so as to hold the level of the sampled segment of said first signal until the next sampling occurs so as to produce the tracking error signal.

2. An optical disc player according to claim 1, wherein said second circuit means comprises second operational circuit means for producing from the output of said photodetecting means a second signal having a level corresponding to defocus on the light beam on the disc when the beam spot formed by the light beam on the disc is positioned on the plane portion between the pits, second pulse generating means for producing a second sampling pulse when the beam spot on the disc is positioned on the plane portion between the pits, and second sampling and hold means for causing said second signal to be subjected to sampling by said second sampling pulse so as to hold the level of the sampled segment of said second signal until the next sampling occurs so as to generate the focus error signal.

3. An optical disc player according to claim 2 wherein said first and second circuit portions include a sampling pulse generating circuit comprising a voltage comparator which receives an input from said photodetecting means, a delay circuit receiving an output of said voltage comparator, first and second multivibrators receiving inputs from said delay circuit and respectively supplying inputs to said first and second sampling and holding means.

* * * * *